Feb. 24, 1953 — H. BRODY ET AL — 2,629,573
SUPPORT FOR WEIGHING SCALES
Filed Sept. 25, 1946 — 2 SHEETS—SHEET 2

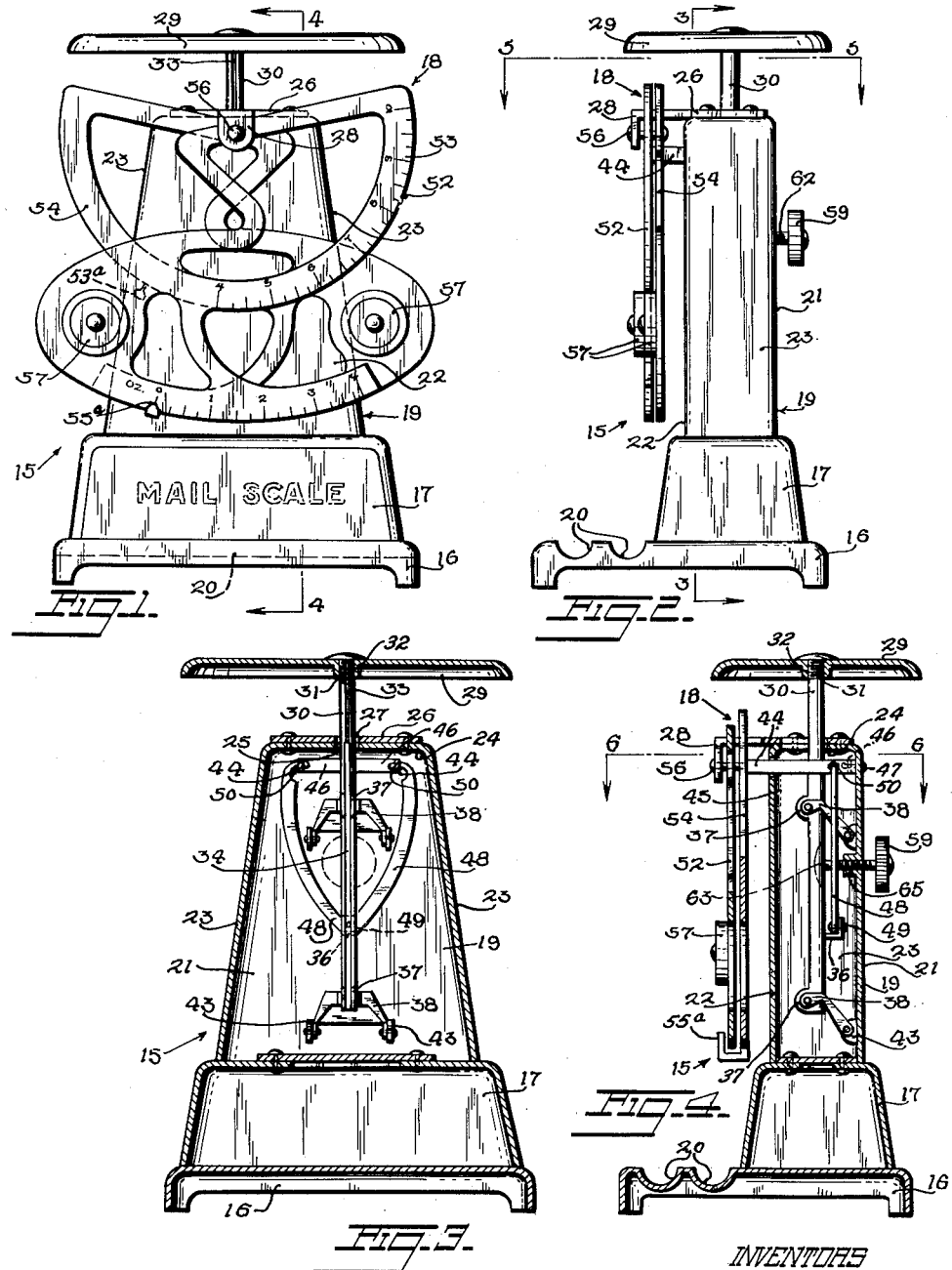

INVENTORS
HARRY BRODY
JACOB BRODY
JULIUS F. HART
BY
ATTORNEY

Patented Feb. 24, 1953

2,629,573

UNITED STATES PATENT OFFICE 2,629,573

SUPPORT FOR WEIGHING SCALES

Harry Brody and Jacob Brody, Brooklyn, and Julius F. Hart, New York, N. Y.

Application September 25, 1946, Serial No. 699,152

4 Claims. (Cl. 248—161)

This invention relates to new and useful improvements in a support for a weighing scale of the pendulum type.

An object of the invention is to provide a support for a weighing scale that is accurate in operation, sturdy in construction, and is formed with simple parts that can be made and assembled at low cost.

Another object is to provide a support for a light weight weighing scale of the pendulum type with means to lock the weighing mechanism when it is not in use to prevent free swinging movement of the pendulums or scale arms.

A further object is to provide a support for a pendulum type weighing scale in which the base and housing can be made as one plastic mold or aluminum casting and all the parts except the weights can be made of sheet metal suitably formed.

These and other objects are accomplished, in brief, by providing a weighing scale having a weighing mechanism and a housing therefor. The mechanism has a vertically disposed tubular post which is positioned partly in the housing and carries a scale pan. Two arms, each pivotally joined at one end to the post and at the other end to the housing, are capable of moving in parallel motion to guide the moving post and maintain its verticality. Two links are pivotally joined at their lower ends to the post and have hooked upper ends which engage two yokes. Each yoke is pivotally joined to the housing and rigidly secured to a pendulum or scale arm. Thus when the post descends, it pulls down the links which in turn rotate the yokes, moving the scale arms apart. The locking means include a locking pin which extends through the housing and through a vertical slot in the post. The locking pin has a locking head within the bore of the tubular post, said head being formed so that in one position the post is free to move, while in another position, the head is forced tight against the inside walls of the post. The head and pin can be turned by means of a knob on the end of the locking pin outside the housing.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a front elevational view of a weighing scale embodying features of the invention herein.

Fig. 2 is a side elevational view of the scale shown in Fig. 1.

Fig. 3 is a sectional view along the line 3—3 of Fig. 2.

Fig. 4 is a sectional view along the line 4—4 of Fig. 1.

Figure 5:
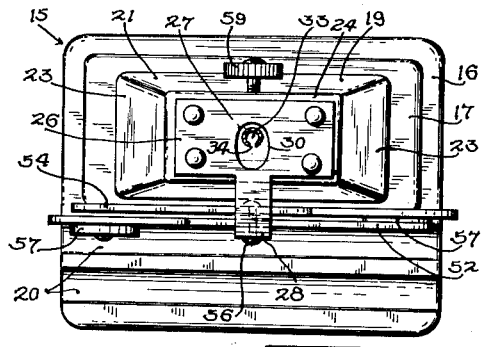
Fig. 5 is a sectional view along the line 5—5 of Fig. 2.

In the drawings, and in this specification, in which like reference numbers designate similar parts, the weighing scale 15 has a base 16, a platform or pedestal 17 mounted on the rear of the base, a weighing mechanism 18, and a housing 19 to enclose part of the weighing mechanism.

The base 16 is substantially rectangular in shape and has two parallel grooves 20 in its upper face forward of the platform 17 to receive writing instruments used to mark letters or items that are weighed.

The housing 19 is mounted on the platform 17 and has a rear wall 21, a front wall 22, side walls 23 extending between the front and rear walls, a top wall 24 with a central opening 25 therein, and a cover plate 26 with an opening 27 aligned with the central opening 25 of the top wall 24 and a flanged end 28 extending downwardly from its front edge.

The scale or weighing mechanism 18 has a scale pan 29 mounted on a movable tubular post 30. An externally threaded upper end 31 of the post 30 is screwed into a central flanged and internally threaded opening 32 in the pan. The pan is disposed above the housing 19 with the post extending freely through the openings 25 and 27 in the top wall 24 and cover plate 26 respectively. The aligned openings 25 and 27 are shaped and arranged, as shown in Fig. 5, to provide a sufficient clearance to permit the post to move downwardly and forwardly relative to the housing 19 which will become clear as this specification proceeds.

The tubular post has a bore 33, a cut-out portion 34 extending longitudinally in its front from the lower end of the post to a point intermediate its ends, a longitudinal slot 35 in the rear intermediate its ends, and a rearwardly extending L-shaped angle 36 between its lower end and the bottom end of the rear slot 35. Two pairs of ears 37 extend forwardly from the post, the ears of each pair facing each other across the cut-out portion 34, one pair being disposed at the lower end of the post and the other pair being disposed below the upper terminus of the cut-out portion.

The post 30 is supported to move upwardly and downwardly maintaining its verticality, by means of two arms 38. Each such arm has a forked forward portion 39 extending adjacent and pivotally joined to one of the pairs of ears 37 by means of pivot pins 40, and two rearwardly projecting free ends 41 pivotally joined by pivot pins 42 to two lugs 43 which extend forwardly from the rear wall 21 of the housing. The distance between the centers of the pivot pins 40 and 42 in opposite ends of each arm 38 is substantially the same, so that the arms can move only in a parallel motion. Thus the arms guide the post, maintaining its verticality as it descends and ascends.

Two spaced parallel yokes 44 extend forwardly from the rear wall of the housing near its top and through openings 45 in the front wall 22 of the housing 19, each of said yokes 44 has its rear end bent inwards. The inwardly bent ends 46 are pivotally attached to the rear wall 21 of the housing by means of a pivot pin 47. Two curved links 48 are pivotally joined to the post 30 at its rear by means of a link pin 49 extending loosely through the lower end of each link and through the L-shaped angle 36. The upper end of each link 48 has a hook 50 which engages one of the yokes 44 intermediate its ends. Thus as the post descends, it carries with it the links 48 which pull down and rotate the yokes 44 about the pivot pin 47.

The forward end of each yoke 44 has a forward ear 51, one of said yoke ears being rigidly secured to the upper end of a substantially Z-shaped scale arm 52 which is provided with graduated scale markings 53 and 55, and the other to a similarly shaped scale arm 54 carrying pointers 53ᵃ and 55ᵃ which register respectively with the scale markings 53 and 55 on the scale arm 52. A slight depression of the pan 29 causes the pointer 55ᵃ to immediately register on the scale marking 55. However, the pointer 53ᵃ is spaced from the end of the scale markings 53 a sufficient distance so that the pointer 53ᵃ will only register with the scale marking 53 when the pointer 55ᵃ has reached the end of its scale marking 55. Thus, the pointers 53ᵃ and 55ᵃ will simultaneously indicate four ounces on their respective scale markings 53 and 55.

Both scale arms 52 and 54 are rotatably mounted on a common pivot pin 56 which extends through said arms and the flanged free depending end 28 of the cover plate 26, the common pivot pin 56 and the depending end 28 being directly forward of the post 30, and the scale arm 52 being forward of the scale arm 54. The pivot pin 56 is in axial alignment with the pivot pin 47 which rotatably supports the rear ends 46 of the yokes 44, to permit free rotational movement of the scale arms 52 and 54 when the yokes 44 are pivoted by downward movement of the links 48. If it is desired, the scale arms can be provided with detachable weights 57 to increase the capacity of the weighing mechanism.

Figure 7:
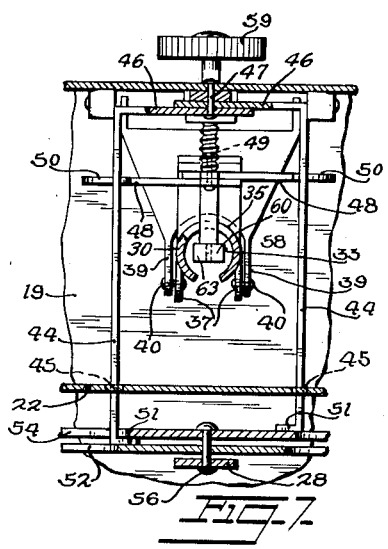
Fig. 7 is an enlarged fragmentary sectional detail view of some of the elements shown in Fig. 6 and illustrating the locking head in its unlocked position within the post.
Figure 6:
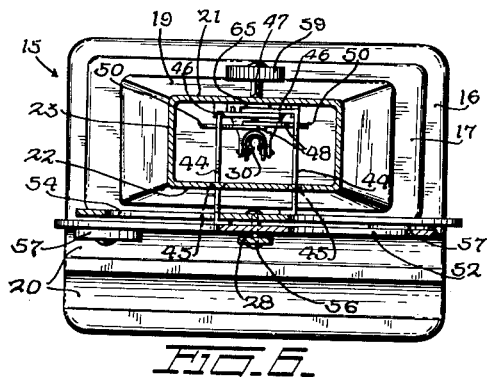
Fig. 6 is a sectional view along the line 6—6 of Fig. 4.
Figure 8:
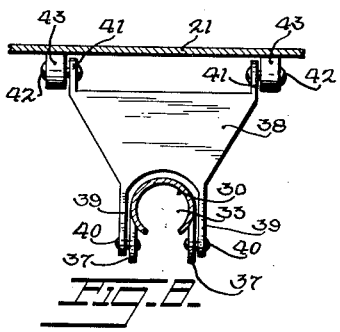
Fig. 8 is a detail plan view of the lower of two arms which move parallel to one another and guide the vertical post of the weighing mechanism.
Figure 9:
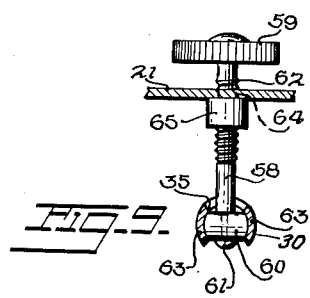
Fig. 9 is a detail view of a locking device of the weighing scale, showing the locking head in locked position within the post.

To prevent the free swinging movement of the scale arms, a locking device is provided which acts on the movable post 30. The locking device has a locking pin 58 with a circular dial knob 59 at one end, a locking head 60 secured to the other end by a pin 61, and external screw threads 62 intermediate its ends. The locking head 60 is elongated and has opposed rounded ends or bearing surfaces 63. The locking device is disposed with the locking pin extending through an opening 64 in the rear wall 21 of the housing and through the slot 35 in the rear of the post, the knob 59 being positioned to the rear of said rear wall, and the locking head 60 being positioned within the bore 33 of the post 30. An interiorly threaded boss 65 extends inwardly from the housing opening 64 and the external threads 62 of the locking pin 58 are engaged therein. In unlocked position, the locking head 60 extends within the post with the longitudinal axis of the head vertical, as shown in Fig. 7, so that no part of the head touches the post, which is free to move up and down with the locking pin extending through the slot 35 in the rear of the post. To lock the weighing mechanism, the knob 59 is turned a quarter turn until the locking head axis is horizontal, see Fig. 9, in which position the rounded ends 63 of the head are drawn tight against the inside walls of the post, preventing movement of the post.

It will be noted, that the simplicity of the structure permits the base, platform and housing to be made as one plastic mold or aluminum casting and all of the other parts excepting the weights 57 to be made of sheet metal suitably formed.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new and desire to secure by United States Letters Patent is:

1. In a scale having a tubular vertical post formed at its rear with an elongated vertical slot and supported to move vertically downwards and forwards, means for locking the vertical post against vertical movement, comprising a locking head extended into the tubular post through said vertical slot, said locking head having a length greater than the width of said slot and equal to the internal diameter of the tubular post for engaging the inside faces of the tubular post to hold the post against moving downwards and forwards when said locking head in turned with its length extended across the interior of the tubular post, said locking head having a width slightly less than the width of said vertical slot to free the tubular post to move vertically downwards and forwards with the tubular post moving away from said locking head when turned with its length extended parallel to the length of said slot, and means rotatively supporting said locking head to be movable between a position in which its length extends across the interior of the tubular post or a position in which its length extends parallel to the length of said vertical slot.

2. In a scale having a tubular vertical post formed at its rear with an elongated vertical slot and supported to move vertically downwards and forwards, means for locking the vertical post against vertical movement, comprising a locking head extended into the tubular post through said vertical slot, said locking head having a length greater than the width of said slot and equal to the internal diameter of the tubular post for engaging the inside faces of the tubular post to hold the post against moving downwards and forwards when said locking head is turned with its length extended across the interior of the tubular post, said locking head having a width slightly less than the width of said vertical slot to free the tubular post to move vertically downwards and forwards with the tubular post moving away from said locking head when turned with its length extended parallel to the length of said slot, and means rotatively supporting said locking head to be movable between a position in which its length extends across the interior of the tubular post or a position in which its length extends parallel to the length of said vertical slot, said locking head having its ends rounded to conform with the rounded internal faces of the tubular post.

3. In a scale having a tubular vertical post formed at its rear with an elongated vertical slot and supported to move vertically downwards and forwards, means for locking the vertical post against vertical movement, comprising a locking head extended into the tubular post through said vertical slot, said locking head having a length greater than the width of said slot and equal to the internal diameter of the tubular post for engaging the inside faces of the tubular post to hold the post against moving downwards and forwards when said locking head is turned with its length extended across the interior of the tubular post, said locking head having a width slightly less than the width of said vertical slot to free the tubular post to move vertically downwards and forwards with the tubular post moving away from said locking head when turned with its length extended parallel to the length of said slot, and means rotatively supporting said locking head to be movable between a position in which its length extends across the interior of the tubular post or a position in which its length extends parallel to the length of said vertical slot, said rotative supporting means comprises a locking pin having an intermediate portion rotatively extended through the rear wall of the housing and having said locking head mounted on the inner end thereof, and means on the outer end of said locking pin for rotating the same between its two operative positions.

4. In a scale having a tubular vertical post formed at its rear with an elongated vertical slot and supported to move vertically downwardly and forwards, means for locking the vertical post against vertical movement, comprising a locking head extended into the tubular post through said vertical slot, said locking head having a length greater than the width of said slot and equal to the internal diameter of the tubular post for engaging the inside faces of the tubular post to hold the post against moving downwards and forwards when said locking head is turned with its length extended across the interior of the tubular post, said locking head having a width slightly less than the width of said vertical slot to free the tubular post to move vertically downwards and forwards with the tubular post moving away from said locking head when turned with its length extended parallel to the length of said slot, and means rotatively supporting said locking head to be movable between a position in which its length extends across the interior of the tubular post or a position in which its length extends parallel to the length of said vertical slot, said rotative supporting means comprises a locking pin having an intermediate portion rotatively extended through the rear wall of the housing and having said locking head mounted on the inner end thereof, and means on the outer end of said locking pin for rotating the same between its two operative positions, said latter-mentioned means comprises an enlarged knob fixedly mounted on the outer end of said locking pin.

HARRY BRODY.
JACOB BRODY.
JULIUS F. HART.

REFERENCES CITED

The following references are of record in the file of this patent:

UNITED STATES PATENTS

| Number | Name | Date |
|---|---|---|
| 815,414 | Frost | Mar. 20, 1906 |
| 833,922 | Frost | Oct. 23, 1906 |
| 1,142,438 | Kirsch | June 8, 1915 |
| 1,240,582 | Kirsch | Sept. 18, 1917 |
| 1,428,165 | Hausman | Sept. 5, 1922 |

FOREIGN PATENTS

| Number | Country | Date |
|---|---|---|
| 168,411 | Great Britain | Sept. 1, 1921 |
| 327,433 | Germany | May 15, 1919 |
| 537,347 | Great Britain | June 18, 1941 |